Jan. 18, 1949. W. H. HICKOK 2,459,225
METHOD OF CONTROLLING HIGH-FREQUENCY
HEATING OF DIELECTRIC MATERIAL
Filed March 15, 1946

INVENTOR
WILLARD H. HICKOK
BY
Woodcock and Phelan
ATTORNEYS

Patented Jan. 18, 1949

2,459,225

UNITED STATES PATENT OFFICE 2,459,225

METHOD OF CONTROLLING HIGH-FREQUENCY HEATING OF DIELECTRIC MATERIAL

Willard H. Hickok, Louisville, Ky., assignor to The Girdler Corporation, Louisville, Ky., a corporation of Delaware Application March 15, 1946, Serial No. 654,771

9 Claims. (Cl. 219—47)

This invention relates to high-frequency heating systems of the type in which high-frequency electrical energy is applied to materials to elevate their temperature, and has for an object the provision of a method of facilitating the heating of materials and of predetermining a particular controlling temperature to which the material may be heated.

Though high-frequency electrical energy has been widely used to heat materials of greatly differing character, no satisfactory means has heretofore been proposed for establishing a predetermined temperature to which it is desired to heat said materials. The nearest approach is to apply the high-frequency energy until a particular temperature is attained and then to terminate the application of the energy. In many cases, it is desirable not only to heat a material to a particular temperature but to maintain it there without further rise above that temperature.

In carrying out the present invention in one form thereof, use is made of an additive substance which not only serves to indicate the attainment of a predetermined temperature but which also serves to introduce a time interval during which a substantially constant temperature may be maintained on the material being heated. More specifically, advantage is taken of the latent heat of vaporization of liquids to control temperature of materials. By mixing with the materials to be heated a liquid selected for a boiling point at the temperature to which the material is to be heated, the material and the added liquid may be heated by high-frequency electrical energy until the mixture attains the boiling point of the liquid. The added heat thereupon causes the liquid to boil or to be converted into its vapor form. Since the added heat is absorbed by the latent heat of vaporization, the heat required to convert the liquid to a vapor, there is little increase in the temperature of the material during this period. Thus, not only is there a definite indication of the attainment of a particular temperature, but also that temperature may be maintained constant for a desired time-interval. The added substance, the liquid, may also impart to the mixture the characteristic of rapid heating. By increasing the loss factor hard-to-heat materials may be rapidly elevated to any selected temperature.

Figure 1:
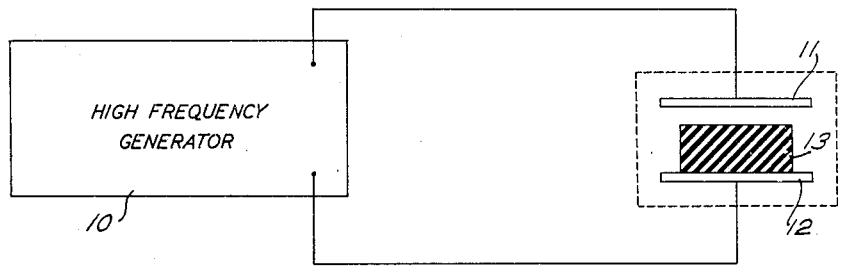

For a more complete understanding of the invention, reference should be had to the following description taken in conjunction with the accompanying drawing in which:

Fig. 1 diagrammatically illustrates a system embodying the invention; and

Figure 2:
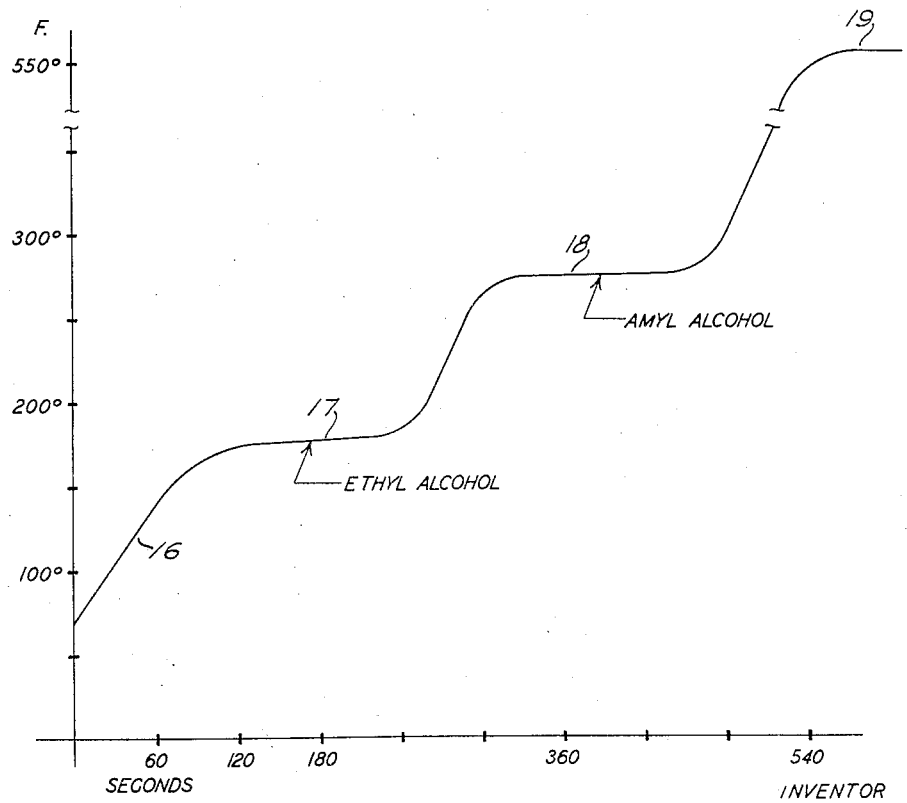

Fig. 2 is a graph illustrative of the operation of the system of Fig. 1.

Referring to the drawing, a high-frequency generator 10 has been illustrated as applying energy to a pair of heating electrodes 11 and 12 between which the work or material 13 is disposed. In heating materials such as sponge rubber and sulphur for vulcanization, it is undesirable to have the temperature rise too high for the reason that the quality of the product will be adversely affected.

In accordance with prior practice, the temperature was limited by closely controlling the time of heating or a temperature measuring scheme was utilized and the heating terminated when that temperature was attained. Measurement of temperature while the material is being heated by high-frequency electrical energy presents a difficult problem. In practice, the heating is generally terminated and temperature measurements made while the oscillator or generator 10 is deenergized. In many applications, such a procedure is undesirable.

In accordance with the present invention, however, there is added to the material 13 (sponge rubber and sulphur, by way of example) prior to heating thereof a liquid or substance having a boiling point of the temperature to which the material 13 is to be heated. Thus, by adding an amyl alcohol to the material 13, high-frequency electrical energy may be applied and when vapor forms, the liquid will have reached its boiling point. When that occurs, it is known that the material 13 will have reached a temperature of 280° F. (for amyl alcohol), the boiling point of the amyl alcohol, and heating may be terminated. For the foregoing material, and for other materials such as uncured rubber, it is desirable to elevate the temperature of the material to approximately 280° F. and hold it there for a period of time. In accordance with the invention, this is readily done by previously adding a predetermined quantity of liquid to the material. Thus, when the liquid is heated to its boiling point, no further rise in temperature will occur until all of the liquid, the amyl alcohol, has been vaporized. Thus, when vaporization terminates, the material will have been held at a predetermined temperature for a predetermined time, assuming that the high-frequency energy has been applied thereto at a constant rate. There is a further desirable action which takes place by reason of the added liquid. If one part of the material undergoing heating, such as the uncured rubber, tends to heat up more rapidly than other parts, its temperature will be held constant at the boiling point of the added liquid until the other points have attained the same temperature; hence, there will be more uniformity in the heating of the material and hot spots will be avoided. Otherwise stated, it is insured that all parts of the material are at the same temperature even though the rate of energy input may be different in different parts because the added liquid precludes rise in any part of the load above the desired temperature level. By selecting a different liquid to be premixed with the material to be heated, a different temperature level may be maintained. Ordinarily, in the case of sponge rubber and in other materials, it will be necessary to add the selected liquid or substance as by milling or rolling it into the mixture. The requirement is that the liquid be uniformly mixed throughout the material to be heated. To control the length of the heating period at a given temperature it is only necessary to predetermine the amount and the latent heat of the added liquid. Usually, more than one liquid may be selected for a given temperature range though they may differ greatly in their latent heat requirements. Where they do differ in their latent heats of vaporization the choice will ordinarily be the one which has the highest latent heat of vaporization.

The invention is also applicable to materials where it is desirable to subject them to preheating for a given period of time and then to elevate their temperature to the desired final degree either with or without final heating thereof to a new and higher temperature. Such a multi-stage, or multi-temperature, heating process is readily provided by adding two or more liquids, each having differing boiling points. For example, ethyl alcohol and amyl alcohol may be mixed together and added to the material. As shown in Fig. 2, the graph 16 plotted with time as abscissae and temperature as ordinates, the temperature will rise to a first plateau 17 of heating at approximately 174° F. The material will be maintained at this temperature until all of the ethyl alcohol has been vaporized. Thereafter, the temperature will rise until the boiling point of the amyl alcohol is attained, at approximately 280° F. Heating may then be terminated, or continued on the second plateau 18 until the amyl alcohol has vaporized. The heating may be relatively rapid from the beginning of the cycle to the first plateau. During this period, sensible heat is added to the mixture to elevate the temperature thereof to the temperature of 174° F. Thereafter, the heat added by the high-frequency electrical energy causes the ethyl alcohol to vaporize (it supplies the latent heat of vaporization). According to the amount of ethyl alcohol present, the temperature plateau 17 may be shortened or extended. When the ethyl alcohol has evaporated, the applied energy then elevates the temperature of the mixture relatively rapidly to its new temperature of 280° F. Again, the high-frequency energy first supplies sensible heat to the mixture and then supplies the latent heat of vaporization for the amyl alcohol. The second plateau 18 is maintained until all of the amyl alcohol has been evaporated or vaporized.

It will of course be understood that pressure directly affects the boiling point, and thereby the temperature. Accordingly, the material 13 may be disposed in an autoclave and the pressure varied in such manner that the boiling points of the added liquids will correspond with the desired temperatures to which the material is to be heated.

If it is desired to heat the material to a still higher temperature, there may be added in the mixture with the ethyl alcohol and the amyl alcohol a further liquid of higher boiling point, such, for example, as glycerine. Accordingly, after the amyl alcohol has been vaporized, the temperature of the material will rise to the third plateau 19 and be there maintained for a time interval depending upon the latent heat of vaporization of the glycerine and quantity initially added to the material. In accordance with the present invention, the added liquids, if they be properly selected, may also facilitate and assist in the heating of the material itself. Liquids having molecules of the polar type have been found to be readily heated by high-frequency electrical energy. Thus, by adding glycerine or other polar liquids, materials which are otherwise heated with difficulty, if at all, may be readily and rapidly heated to any desired temperature. For example, polystyrene has been found to be exceedingly difficult to heat by means of high-frequency energy. However, by adding to the polystyrene particles a polar liquid, such as glycerine, the material may be rapidly and effectively heated. Though not critical, the frequencies usually employed for such materials range upwardly from around one million cycles per second.

The liquids previously mentioned are to be taken as suggestive. The amyl alcohol provides a plateau 18 at a temperature of approximately 280° F. Still higher plateaus of temperature may be established by utilizing a glycol, such as diethylene glycol, boiling point around 480° F., or glycerine for a temperature plateau of around 554° F. In accordance with the invention, great flexibility is provided in the high-frequency heating operations. Liquids of other boiling points may also be used providing they are in general inert with respect to the material being treated.

The vaporization of the respective liquids may also be utilized as temperature indicators, where for example a liquid gives of a distinctive odor as it is vaporized. Other modifications within the scope of the appended claims may now suggest themselves.

What is claimed is:

1. The method of controlling the temperature of a material during the application of high-frequency electrical energy thereto which consists in mixing with the material prior to the application of said energy a substance having a phase-transition point at a temperature corresponding with the temperature to which the material is to be maintained constant for a period of time, and applying said high-frequency energy to the mixture until it passes through said point so to establish a time-interval of constant temperature of said material by utilizing the latent heat of phase-transition of said substance to prevent further rise in temperature of the material during said time-interval.

2. The method of controlling the relation between time and temperature of a material to be dielectrically heated which comprises mixing with the material a liquid which boils at a desired temperature and in quantity corresponding with the interval at which it is desired to hold the temperature of said material constant, and applying high-frequency energy to heat said mixture of material and liquid until said liquid boils out of the mixture.

3. The method of controlling the temperature of materials subjected to high-frequency electrical energy which consists in mixing with such materials a mixture of liquids of different boiling points, applying high-frequency electrical energy to said mixture of liquids and material, the temperature of said mixture remaining at the vaporization temperature of the lower boiling point liquid until complete evaporation of said lower boiling point liquid occurs, the temperature then rising to the boiling point of the higher boiling point liquid, and thereafter terminating the application of said energy during vaporization of said higher boiling point liquid.

4. The method of increasing the rate of dielectric heating of a material and controlling its temperature during heating which comprises uniformly mixing with the material a non-aqueous substance having a higher loss factor than said material and having a phase-transition point at a temperature corresponding with a temperature at which it is desired to hold said material constant, and applying high-frequency energy to heat the mixture to said temperature at which the latent heat of said substance precludes further rise in temperature of said material during continued application of the high-frequency energy the uniform mixing of said substance insuring a constant temperature uniform throughout said material during phase-transition of said substance and the higher loss factor of said substance increasing the rate of heating of said material up to the phase-transition temperature of said substance.

5. In dielectric heating of material, the method of obtaining uniformity of temperature of the material over a predetermined time-interval which comprises mixing therewith a predetermined quantity of a substance vaporizable at the desired temperature of treatment of said material, and subjecting the uniform mixture so formed to a high-frequency electric field until at least substantially all of said substance has vaporized to insure a constant temperature uniform throughout said material for a predetermined time.

6. The method of inducing heat in dielectric material and controlling the temperature thereof during the heating which comprises mixing therewith a liquid vaporizable at desired temperature of treatment of said material, and subjecting the uniform mixture so formed to a high-frequency electric field until at least substantially all of said substance has vaporized to insure a constant temperature uniform throughout said material for a desired time-interval predetermined by the amount and latent heat of said liquid.

7. The method of inducing heat in dielectric material having low loss factor and controlling the temperature thereof during the heating which comprises mixing therewith a polar liquid vaporizable at desired temperature of treatment of said material, and subjecting the mixture to a high-frequency electric field for heating of said material to said temperature at rate enhanced by said polar liquid and with constancy of uniform temperature throughout the material during vaporization of said liquid.

8. The method of heating dielectric material and controlling the temperature thereof during heating which comprises uniformly mixing with said material a predetermined quantity of a substance which vaporizes at a predetermined temperature corresponding with that to which it is desired to heat said material, and subjecting said mixture to a high frequency electric field to generate heat in the mixture, the added quantity of said substance being selected in dependence upon the latent heat of vaporization of the substance to predetermine the period of time during which the temperature of said material is held constant at the desired value by vaporization of said substance.

9. The method defined in claim 8, further characterized in that said added vaporizable substance is selected to have a dielectric loss factor such as to impart to said mixture a loss factor substantially higher than that of said material itself so to obtain accelerated rate of heating to said desired temperature and until said substance has vaporized.

WILLARD H. HICKOK.

REFERENCES CITED

The following references are of record in the file of this patent:

UNITED STATES PATENTS

| Number | Name | Date |
|---|---|---|
| 2,204,617 | Peel et al. | June 18, 1940 |
| 2,296,948 | Pitman | Sept. 29, 1942 |
| 2,336,542 | Hatfield | Dec. 14, 1943 |
| 2,364,790 | Hemming | Dec. 12, 1944 |

OTHER REFERENCES

"Handbook of Chemistry and Physics," 21 Edition, published 1946 by Chemical Rubber Publishing Company, Cleveland, Ohio, page 1394.